June 8, 1926.
D. LIZZI
1,587,914
SIGNAL LIGHT FOR AUTOS
Filed July 18, 1924     2 Sheets-Sheet 2
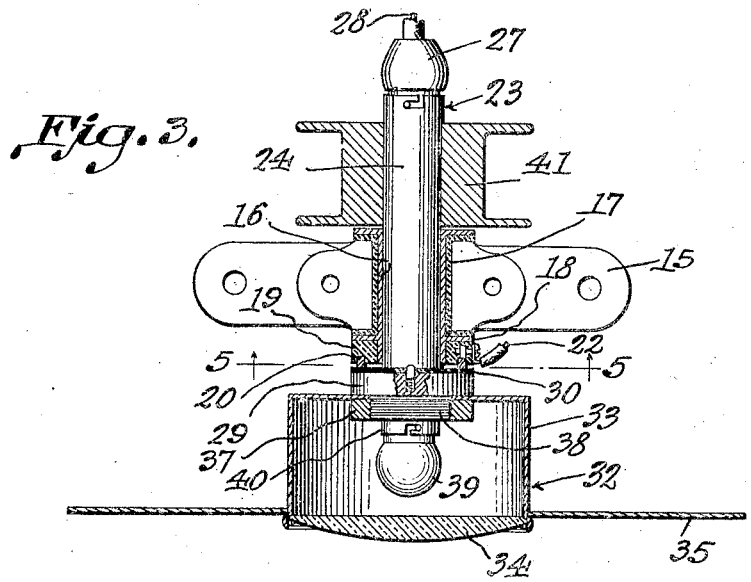
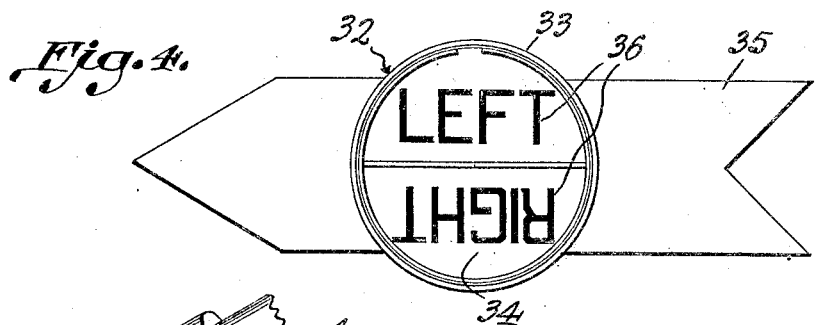
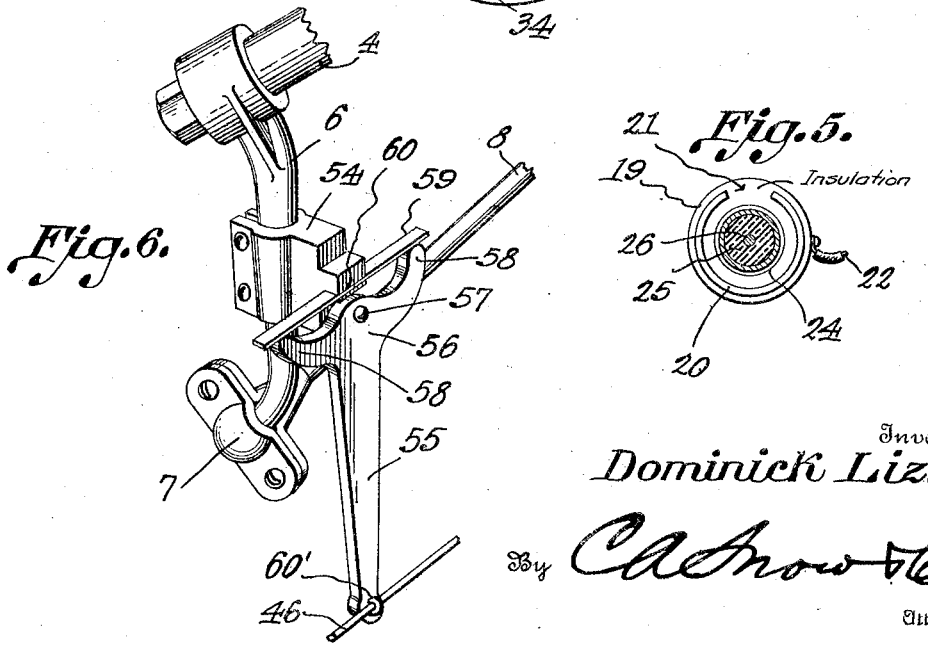
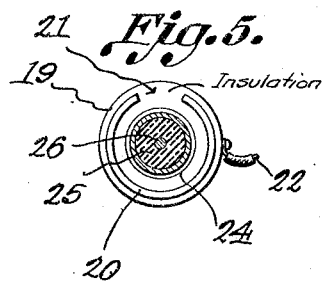
Inventor
Dominick Lizzi
By C. A. Snow & Co.
Attorneys Patented June 8, 1926.

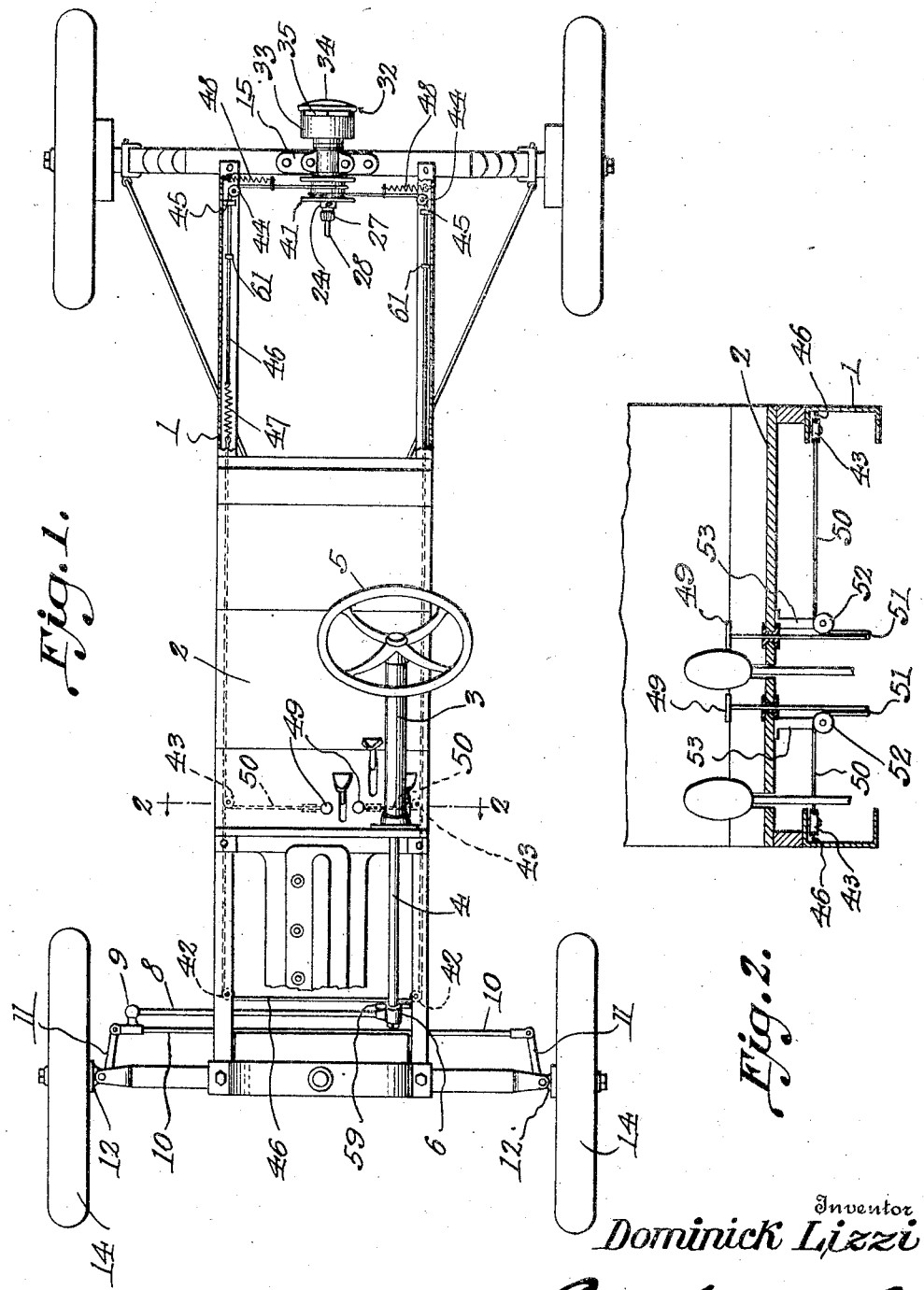

1,587,914

UNITED STATES PATENT OFFICE.

DOMINICK LIZZI, OF PEN YAN, NEW YORK.

SIGNAL LIGHT FOR AUTOS.

Application filed July 18, 1924. Serial No. 726,791.

This invention aims to provide novel means whereby a signal on the rear of a motor propelled vehicle may be operated either through the instrumentality of pedals, or by way of the steering mechanism, to indicate the direction in which the vehicle is to be steered.

It is within the province of the disclosure to improve generally and to enhance the utility of devices of that type to which the invention appertains.

Although a preferred form of the invention has been shown, a mechanic, working within the scope of what is claimed, may make changes and alterations without departing from the spirit of the invention.

In the accompanying drawings:—

Figure 1 shows in top plan, a motor vehicle whereunto the device forming the subject matter of this application has been applied; Figure 2 is a cross section on the line 2—2 of Figure 1; Figure 3 is a sectional view showing the signal and its mounting; Figure 4 is a rear elevation of the signal; Figure 5 is a cross section on the line 5—5 of Figure 3; Figure 6 is a perspective view showing the compensating connection between the steering mechanism and the means for operating the signal.

The numeral 1 marks the frame of an automobile, the platform being shown at 2, the steering shaft column at 3, the steering shaft at 4, and the steering wheel at 5. The numeral 6 designates an arm on the shaft 4, the arm being connected at 7 with the link 8 which, in turn, is connected at 9 with the cross rod 10, the latter being pivoted to the arms 11 on the stub axles 12 which carry the forward wheels 14—all as usual.

A bracket 15 is mounted on the rear end of the frame 1 and embodies a tubular bearing 16 which is insulated at 17 from the bracket 15, the bearing having an outstanding flange 18. A disk 19 of insulating material surrounds the rear end of the bearing 16 and abuts against the flange 18. The disk carries a conducting track 20 of circular form, there being a gap 21 in the track. The track 20 is grounded through a conductor 22 connected mechanically to the disk 19 and electrically to the track. A shaft 23 is journaled in the bearing 16, and comprises a tubular body 24, and a core 25, the core being made of insulating material. Within the core is located a conductor member 26 adapted to be joined electrically, by any suitable means 27 with a conductor 28. The member 25 has an enlarged head 29 carrying an insulating plate 30 cooperating with the track 20. A spring pressed contact 31 is movable in the head 29 and cooperates with the track 20. A signal 32 is assembled with the head 29 and comprises a cup-shaped body 33 provided with a lens 34 and carrying an indicator 35, which may be in the form of an arrow. The lens 34 is marked at 36 with the words "Right" and "Left". A collar 37 is threaded on a reduced portion 38 of the member 29 and retains the body 33 of the signal in place. A lamp 39 is mounted in a socket 40 carried by the part 38. One side of the lamp 39 is connected electrically with the conducting member 26, and the other side of the lamp is connected electrically with the contact 31 which traverses the track 20. A drum 41 is mounted on the tubular body 24 of the shaft 23.

Direction-changing idlers 42, 43 and 44, in the form of pulleys, are mounted on the frame 1, the frame being provided, at points slightly in advance of the idlers 44, with abutments 45. A flexible element 46 is extended across the idlers 42 at the forward end of the frame 1, and is carried rearwardly along the idlers 43, and about the idlers 44, the ends of the flexible element being wound about the drum 41 in opposite directions. In the flexible element may be interposed a retractile spring 47 which holds the flexible element taut. Return springs 48 are located at the rear end of the vehicle, the springs being retractible. The inner ends of the springs 48 are connected to the inwardly extended portions of the flexible element 46, and the outer ends of the springs are connected to the side portions of the frame 1. Pedals 49 are mounted for vertical reciprocation in the platform 2. Branch lines 50 are connected at their outer ends to opposed portions of the flexible element 46 and are adapted to move over the pulleys 43. The inner ends of the lines 50 are connected at 51 to the lower ends of the pedals 49. Intermediate their ends, the lines 50 are rove across guide pulleys 52 journaled on supports 53 depending from the platform 2.

On the arm 6 of the steering shaft 4 is located a carrier 54, in the form of a clamp block, an arm 55 being provided, and having a head 56 which is pivoted at 57 to the carrier 54, the head having upstanding ends 58 bearing against a spring strip 59 secured intermediate its ends as at 60 on the carrier or clamp block 54. The lower end of the arm 55 is secured at 60 to the forward portion of the flexible element 46. The flexible element 46 is equipped with stops 61 adapted to cooperate with the abutments 45 on the frame 1.

In practical operation, the operator depresses one or the other of the pedals 49, and the corresponding branch line 50 causes the flexible element 46 to run over the idlers 42, 43 and 44, one of the springs 48 being extended, to return the parts to the position shown in Figure 1, when the pressure on the selected pedal 49 ceases. From the flexible element 46, rotation is imparted to the shaft 23, the indicator 35 is turned to show the direction in which the vehicle is to proceed, and the appropriate one of the words 36 on the lens 34 of the signal 32 is presented upright as in Figure 4, the lamp 39 being lighted, to illuminate the signal, because, when the shaft 23 is rotated, the contact member 31 moves out of the gap 21 in the track 20, and upon the track, the circuit through the lamp 39 thus being closed. When the device is operated by one of the pedals 49, as hereinbefore explained, the operator may be holding the steering wheel 5, so that the steering shaft 4 cannot turn. This condition exists when, for instance, the operator wishes to actuate the signal 32 by one of the pedals 49, before the vehicle reaches a corner, and before the steering wheel 5 is manipulated, to cause the vehicle to turn the corner. When the flexible element 46 is actuated by one of the pedals 49, the shaft 4 being held against rotation, the arm 55 will swing on its pivotal mounting 57, responsive to the pull on the flexible element 46, and the spring 59 will yield, a compensating connection thus being afforded between the flexible element 46 and the steering mechanism 6—4—5. If the operator does not care to give a signal until he starts to turn the corner, or if, absent-mindedly, he neglects to operate one of the pedals 49, then, as soon as the steering shaft 4 is rotated by means of the wheel 5, the arm 55 will swing with the arm 6 and actuate the flexible element 46 to operate the signal 23, the spring 59 being stronger than the springs 48 and serving as a connection between the arms 55 and 6, whereby these arms may operate together when the shaft 4 is rotated.

Whether the device be operated from the steering shaft 4, or from the pedals 49, the stubs 61 on the flexible element 46 come into contact with the abutments 45 on the frame 1, thus limiting the rotation of the shaft 23 so that the indicator 45 assumes a horizontal position, with the proper word shown at 36, likewise displayed in a horizontal position.

What is claimed is:—

1. In a vehicle, the combination with the steering shaft and the steering arm, of a signal on the vehicle, a loop-shaped flexible element guided on the vehicle, means for connecting the flexible element with the signal to operate the signal in opposite directions, independent pedals movably mounted on the vehicle, branch lines connecting the pedals with opposite side portions of the flexible element, to operate the signal in opposite directions as aforesaid, means for guiding the branch lines intermediate their ends, and a compensating connection between the steering arm and the forward part of the loop-shaped flexible element.

2. A device of the class described, constructed as set forth in claim 1, and further characterized by the fact that the compensating connection comprises a carrier mounted on the steering arm, a supplemental arm mounted pivotally on the carrier and having a transverse head, and a spring mounted intermediate its ends on the carrier and engaged at its ends with the ends of the head.

In testimony that I claim the foregoing as my own, I have hereto affixed my signature.

DOMINICK LIZZI.